(12) United States Patent
Hauck

(10) Patent No.: US 8,991,577 B2
(45) Date of Patent: Mar. 31, 2015

(54) PARALLEL DUAL CLUTCH UNIT

(75) Inventor: Hans Juergen Hauck, Schwaebisch Hall (DE)

(73) Assignee: BorgWarner Inc., Auburn Hills, MI (US)

( * ) Notice: Subject to any disclaimer, the term of this patent is extended or adjusted under 35 U.S.C. 154(b) by 62 days.

(21) Appl. No.: 13/813,180

(22) PCT Filed: Aug. 4, 2011

(86) PCT No.: PCT/US2011/046533
§ 371 (c)(1),
(2), (4) Date: Jan. 30, 2013

(87) PCT Pub. No.: WO2012/021363
PCT Pub. Date: Feb. 16, 2012

(65) Prior Publication Data
US 2013/0126291 A1 May 23, 2013

(30) Foreign Application Priority Data
Aug. 12, 2010 (DE) .......................... 10 2010 034 128

(51) Int. Cl.
*F16D 21/06* (2006.01)
*F16D 21/00* (2006.01)

(52) U.S. Cl.
CPC ................ *F16D 21/00* (2013.01); *F16D 21/06* (2013.01); *F16D 2021/0661* (2013.01); *F16D 2021/0692* (2013.01)
USPC ................................. 192/48.611; 192/48.609

(58) Field of Classification Search
CPC ............................................. F16D 2021/0692
USPC .................................................... 192/48.609
See application file for complete search history.

(56) References Cited

U.S. PATENT DOCUMENTS 4,044,869 A * 8/1977 Gros ........................ 192/48.613
4,658,663 A * 4/1987 Hiraiwa .......................... 74/330

(Continued)

FOREIGN PATENT DOCUMENTS

EP 1195537 B1 4/2002
EP 1568906 A1 8/2005

(Continued)

OTHER PUBLICATIONS

International Search Report and Written Opinion ; date of mailing , Mar. 27, 2012 ; for International Application No. PCT/US2011/046533 ; 11 pages.

(Continued)

*Primary Examiner* — Rodney H Bonck
(74) *Attorney, Agent, or Firm* — BrooksGroup

(57) ABSTRACT

The present invention relates to a parallel dual clutch unit (2) for arrangement in a drivetrain of a motor vehicle between a drive unit (4) and a transmission (6), which comprises a first multi-plate clutch (30) assigned to a first transmission input shaft (10) and having a first plate pack (38), a first inner plate carrier (36) and a first outer plate carrier (34) for selective torque transmission between the drive unit (4) and the first transmission input shaft (10), and a second multi-plate clutch (32) assigned to a second transmission input shaft (12) and having a second plate pack (44), a second inner plate carrier (42) and a second outer plate carrier (40) for selective torque transmission between the drive unit (4) and the second transmission input shaft (12), the first inner plate carrier (36) being embodied as input side and the first outer plate carrier (34) as output side of the first multi-plate clutch (30), while the second inner plate carrier (42) is embodied as output side and the second outer plate carrier (40) as input side of the second multi-plate clutch (32).

13 Claims, 2 Drawing Sheets

(56) References Cited

U.S. PATENT DOCUMENTS

Figure 1:
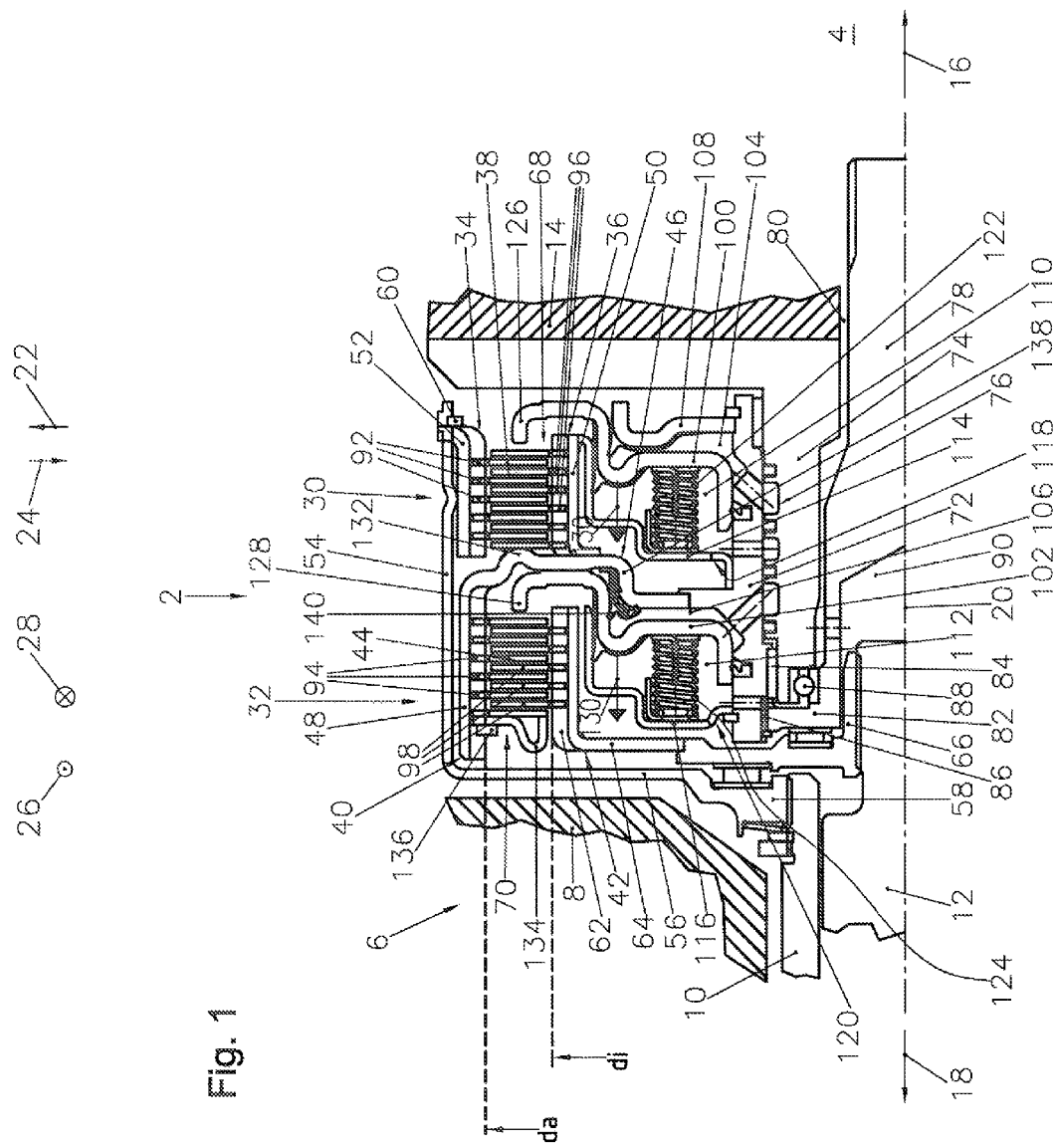

| | | | |
|---|---|---|---|
| 6,021,879 A | * | 2/2000 | Pelouch ................... 192/48.619 |
| 7,246,692 B2 | | 7/2007 | Braford |
| 7,743,898 B2 | * | 6/2010 | Gerlach ..................... 192/48.91 |
| 2005/0189195 A1 | | 9/2005 | Heinrich et al. |
| 2005/0284725 A1 | * | 12/2005 | Bauer et al. ................. 192/87.11 |
| 2006/0086586 A1 | | 4/2006 | Braford |
| 2007/0175723 A1 | | 8/2007 | Blessing et al. |

FOREIGN PATENT DOCUMENTS

| | | |
|---|---|---|
| JP | 2008540977 A | 11/2008 |
| KR | 20070024704 A | 3/2007 |

OTHER PUBLICATIONS

Chinese Office Action dated Sep. 5, 2014; Application No. 201180035470.6; Applicant: BorgWarner; 14 pages.

* cited by examiner

PARALLEL DUAL CLUTCH UNIT

The present invention relates to a parallel dual clutch unit for arrangement in a drivetrain of a motor vehicle between a drive unit and a transmission.

EP 1 195 537 B1 describes a parallel dual clutch unit. The known dual clutch unit comprises a first multi-plate clutch assigned to a first transmission input shaft and having a first plate pack, a first inner plate carrier and first outer plate carrier for selective torque transmission between the drive unit and the first transmission input shaft. In addition the known dual clutch unit comprises a second multi-plate clutch assigned to a second transmission input shaft, which correspondingly comprises a second plate pack, a second inner plate carrier and a second outer plate carrier, in order to allow a selective torque transmission between the drive unit and the second transmission input shaft. The two inner plate carriers form the input side of the respective multi-plate clutch, whilst the two outer plate carriers form the output side of the respective multi-plate clutch.

The design of a dual clutch unit described above has proven its worth, but is disadvantageous in that relatively high mass moments of inertia occur on the output side, that is to say on the two transmission input shafts. This high mass moment of inertia acting on the transmission input shafts leads to accordingly elaborate synchromesh devices inside the succeeding transmission.

An object of the present invention, therefore, is to create a parallel dual clutch unit for arrangement in a drivetrain between a drive unit and a transmission, which unit on the one hand ensures a lower mass moment of inertia on the succeeding transmission input shafts and which on the other hand has a relatively simple construction.

This object is achieved by the features specified herein in claim 1. Advantageous embodiments of the invention form the subject matter of the dependent claims.

The dual clutch unit according to the invention is designed for arrangement in a drivetrain of a motor vehicle between a drive unit and a transmission. The dual clutch unit comprises a first multi-plate clutch, assigned to a first transmission input shaft and having a first plate pack, a first inner plate carrier and a first outer plate carrier for selective torque transmission between the drive unit and the first transmission input shaft. In addition the dual clutch unit according to the invention comprises a second multi-plate clutch, assigned to a second transmission input shaft and having a second plate pack, a second inner plate carrier and a second outer plate carrier for selective torque transmission between the drive unit and the second transmission input shaft. The dual clutch unit in question is a so-called parallel dual clutch unit, in which consequently the two plate packs are not radially nested, as is the case with a concentric dual clutch unit, but are instead arranged axially staggered. In parallel dual clutch units the two plate packs need not necessarily overlap one another, viewed in an axial direction, but it is advantageous if the two plate packs, viewed in an axial direction, overlap one another at least partially and preferably entirely. The aforementioned first inner plate carrier is embodied as input side of the first multi-plate clutch, whilst the first outer plate carrier is embodied as output side of the first multi-plate clutch. By contrast, the second inner plate carrier is embodied as output side of the second multi-plate clutch, whilst the second outer plate carrier is embodied as input side of the second multi-plate clutch.

Since in the second multi-plate clutch the second inner plate carrier functions as output side, this can be of especially short construction in a radial direction, so that the mass moments of inertia acting on the second transmission input shaft are relatively small. In this way the synchromesh devices assigned to the gears on the second transmission input shaft can also be of particularly simple design. Since the output side of the first multi-plate clutch is not formed by the first inner plate carrier, however, but by the first outer plate carrier, the parallel dual clutch unit according to the invention can be of an especially simple construction. The dual clutch unit according to the invention therefore also reveals its advantages over a dual clutch unit as is described in EP 1 568 906 A1 and in which the output side of both multi-plate clutches is formed by the inner plate carriers and the input side of both multi-plate clutches is formed by the outer plate carriers. Thus it is possible in the case of the dual clutch unit according to the invention to dispense, in particular, with an outer actuating piston, which externally radially encloses the clutches and which would necessitate an especially large outlay with regard to the centering and the balancing.

In a preferred embodiment of the dual clutch unit according to the invention this is embodied as a wet-running dual clutch unit. In this case oil is preferably used as cooling and/or lubricating medium.

In order to minimize the overall space taken up by the dual clutch unit and if necessary to shorten its overall axial length, in a further preferred embodiment of the dual clutch unit according to the invention the first inner plate carrier and the second outer plate carrier comprise a common radial support portion for radially supporting the first inner plate carrier and the second outer plate carrier.

In order to allow the parallel arrangement of the two plate packs and axial staggering of these, in an advantageous embodiment of the dual clutch unit according to the invention the first inner plate carrier comprises a tubular inner plate bearing portion, which extends from the radial support portion in an axial direction, whilst the second outer plate carrier comprises a tubular outer plate bearing portion, which extends from the radial support portion in the opposite axial direction.

In order to allow a parallel arrangement of the plate packs, in which the plate packs overlap one another, viewed in an axial direction, in a further advantageous embodiment of the dual clutch unit according to the invention the diameter of the outer plate bearing portion of the second outer plate carrier is designed larger than the diameter of the inner plate bearing portion of the first inner plate carrier. Said diameter may be the inside diameter, outside diameter or mean diameter of the respective plate bearing portion, for example.

In order to increase the stability of the first inner plate carrier and of the second outer plate carrier, which comprise a common radial support portion, and to facilitate their production, in a particularly advantageous embodiment of the dual clutch unit according to the invention the outer plate bearing portion of the second outer plate carrier is integrally formed with the radial support portion, whilst the inner plate bearing portion is connected to the radial support portion by a positively interlocking, frictional or cohesive material connection. Here the outer plate bearing portion of the second outer plate carrier has preferably been produced together with the radial support portion by deep-drawing in one operation, whilst only thereafter has the inner plate bearing portion of the first inner plate carrier been connected to the radial support portion by a positively interlocking, frictional or cohesive material connection. It is furthermore preferred here if the inner plate bearing portion is connected to the radial support portion by a positively interlocking or frictional connection, especially since a cohesive material connection, as can be obtained by welding the components, for example, can lead to damaging of the adjacent components. Such damage may consist, for example, of a fouling of the adjacent plate bearing portions or a weakening of the radial support portion. A cohesive material connection by means of welding would moreover increase the cost of production.

In a further preferred embodiment of the dual clutch unit according to the invention the first outer plate carrier comprises a tubular outer plate bearing portion, which together with the inner plate bearing portion of the first inner plate carrier defines a first annular space to accommodate the first plate pack, whilst the second inner plate carrier comprises a tubular inner plate bearing portion, which together with the outer plate bearing portion of the second outer plate carrier defines a second annular space to accommodate the second plate pack. The plate bearing portions therefore define the respective annular space inwards and outwards in a radial direction. In order to achieve an extensive overlap of the plate packs viewed in an axial direction, at least the inside or outside diameter, preferably the inside and outside diameter, of the first and second annular spaces are of equal size.

In an especially advantageous embodiment of the dual clutch unit according to the invention, which is based on the embodiment described above, the first outer plate carrier comprises an outer plate bearing portion offset radially inwards in relation to a tubular bridging portion, which bridges the outer plate bearing portion of the second outer plate carrier radially outwards. Offsetting the outer plate bearing portion of the first outer plate carrier radially inwards allows it to have the same inside diameter as the outer plate bearing portion of the second outer plate carrier. In order to facilitate the manufacture and assembly of the dual clutch unit in this embodiment, the outer plate bearing portion offset radially inwards is preferably rotationally fixed by a releasable connection to the bridging portion of the first outer plate carrier. With regard to the assembly and production, it has proved advantageous here if the outer plate bearing portion of the first outer plate carrier and the bridging portion of the first outer plate carrier can be fitted together in an axial direction, in order to obtain the rotationally fixed and detachable connection.

In a further preferred embodiment of the dual clutch unit according to the invention the common radial support portion of the first inner plate carrier and the second outer plate carrier is rotationally fixed to a tubular clutch main hub. The clutch main hub is preferably rotatably supported on a fixed bearing tube, which extends into the clutch main hub, and through which a clutch input hub or shaft or the first and second transmission input shaft extend.

In an advantageous embodiment of the dual clutch unit according to the invention the aforementioned bearing tube is arranged on a fixed housing part. The fixed housing part may be a part of a transmission housing or a drive or engine housing, for example. The two multi-plate clutches can preferably be supplied with oil via said housing part and the bearing tube, more preferably by means of a rotational bushing between the bearing tube and the clutch main hub. Thus, for example, corresponding ducting may be formed inside the housing part and the bearing tube. The oil may be hydraulic oil, for example, for driving the actuating pistons of the multi-plate clutches, cooling oil and lubricating oil for cooling and lubricating the plate packs and/or compensating oil for supplying the compensating chambers assigned to the actuating pistons.

In order to reduce the number of components required, in a further advantageous embodiment of the dual clutch unit according to the invention one of the plate packs, preferably the first plate pack, can be supported in an axial direction, preferably directly, on the radial support portion. An additional support ring in the form of a further component is therefore not necessary, especially since the radial support portion already present is used to support said plate pack in an axial direction. For quite specifically supporting the plate pack here, the radial support portion preferably comprises a projection, which protrudes in the direction of the plate pack and on which the plate pack can be supported in an axial direction. At the same time this projection is more preferably of annular design, in order to afford uniform support of the plate pack over its entire circumference in an axial direction. Alternatively or in addition the annular projection protruding in the direction of the plate pack is formed by an outward bulge in the support portion and is therefore integrally formed with the radial support portion.

With regard to the construction, assembly and operation of the dual clutch unit it has furthermore proved advantageous if the first multi-plate clutch and the second multi-plate clutch have the same direction of actuation. The direction of actuation of the respective multi-plate clutch is here taken to mean that direction in which an actuating member assigned to the respective multi-plate clutch is moved in order to compress the multi-plate clutch. Such an actuating member may be, for example, the hydraulically driven actuating piston described in more detail below. Thus the first multi-plate clutch may preferably be actuated by a hydraulically driven first actuating piston, whilst the second multi-plate clutch may be actuated by a hydraulically driven second actuating piston. As already previously pointed out, the first actuating piston and the second actuating piston have the same direction of actuation.

In a further particularly advantageous embodiment of the dual clutch unit according to the invention the radial support portion comprises a tubular segment. The tubular segment, which therefore extends in an axial direction, is here designed in such a way that one of the actuating pistons, preferably the second actuating piston, is or can be supported on the segment in a radial direction. The tubular segment of the radial support portion therefore functions as guide, it being preferred if the actuating piston is or can be supported in a radial direction on the tubular segment with the interposition of a seal. Since a segment of the radial support portion, that is to say the tubular segment, serves for supporting, guiding and/or sealing the actuating piston in relation to the radial support portion, no additional wall part has to be provided, thereby further reducing the number of parts and further facilitating the production and assembly.

In a further especially preferred embodiment of the dual clutch unit according to the invention the outer plates of both plate packs are embodied as friction lining plates, whilst the inner plates of both plate packs are embodied as unlined plates, or vice-versa. Consequently this means that in one of the two multi-plate clutches the friction lining plates are arranged on the input side and the unlined plates on the output side of the multi-plate clutch, whilst in the other multi-plate clutch the friction lining plates are arranged on the output side and the unlined plates on the input side of the multi-plate clutch. In this way the two multi-plate clutches of the dual clutch unit are optimized in respect of their different characteristics. Thus, of the two multi-plate clutches, that multi-plate clutch, in which friction lining plates are provided on the input side and unlined plates are provided on the output, has a relatively low drag torque. By contrast the other multi-plate clutch, in which unlined plates are provided on the input side and friction lining plates are provided on the output side, has an especially high thermal stability. In this embodiment it is further preferred if the friction lining plates are embodied as friction lining plates having a friction lining on both sides, the friction lining more preferably being formed by a paper friction lining. The unlined plates are preferably steel plates. A friction lining is here preferably taken to mean a lining which has been additionally applied to a friction lining carrier and more preferably is not integrally formed with the friction lining carrier.

In order to further facilitate the production and assembly of the dual clutch unit, the outer plates of the two plate packs have the same inside and outside diameter, the outer plates preferably being of identical construction, whilst the inner plates of the two plate packs alternatively or additionally have the same inside and outside diameter, the inner plates of the two plate packs preferably being of identical construction. Plates of identical construction are here in particular taken to mean plates which are of identical design in their constituent parts and dimensions, disregarding production tolerances.

In the lower gears of a transmission the synchromesh devices have to cope with greater clutch masses or friction torques than in the higher gears. This is particularly the case with the first gear of a transmission, so that the synchromesh device intended for this purpose has to be of particularly costly design. In order to reduce this outlay, the second transmission input shaft, which is driven via the second inner plate carrier functioning as output side of the second multi-plate clutch, is assigned to the first gear, preferably the gear wheel of the first gear, of the transmission. As already explained at the outset, the choice of the second inner plate carrier as output side of the second multi-plate clutch ensures that lower mass moments of inertia act on the second transmission input shaft, so that a synchromesh device for the first gear of the transmission can also be of simpler, less robust design. In this embodiment the second transmission input shaft is preferably embodied as an inner transmission input shaft, which extends into the first transmission input shaft embodied as a hollow shaft. In this embodiment it is furthermore especially preferred if a synchromesh device is assigned to the first gear wheel.

In a further advantageous embodiment of the dual clutch unit according to the invention a clutch housing is provided, inside which the first and second multi-plate clutches are arranged, and which is rotationally fixed to the clutch main hub. Here a clutch input hub or shaft, which is in rotationally driven connection with the clutch housing, is furthermore provided. In this embodiment the torque from the drive unit is therefore introduced into the first and second multi-plate clutch via the clutch input hub or shaft, the clutch housing and the clutch main hub. In this embodiment and in the embodiment described below it is furthermore preferred if the torque from the drive unit is transmitted to the clutch input hub or shaft by way of a torsional vibration damper.

In a further especially preferred embodiment of the dual clutch unit according to the invention, which represents an alternative to the embodiment described above, the dual clutch unit comprises a clutch input hub or shaft, via which the torque of the drive unit can be transmitted to the dual clutch unit. The clutch input hub or shaft extends into the clutch main hub, already described previously, preferably also in the bearing tube, on which the clutch main hub is supported, the clutch input hub or shaft being in rotationally driven connection with the clutch main hub via a rotational drive part. Here the rotational drive part may be formed both separately from the clutch input hub or shaft and integrally with the clutch input hub or shaft. Regardless of the respective configuration of the rotational drive part, this embodiment of the dual clutch unit according to the invention has the advantage that the torque of the clutch input hub or shaft can be transmitted particularly directly to the clutch main hub, whilst an elaborate clutch housing, accommodating the multi-plate clutches and transmitting the torque, can be dispensed with. Only said rotational drive part of small overall dimensions is required in order to transmit the torque of the clutch input hub or shaft to the clutch main hub, so that both the weight and the cost of assembling or producing the dual clutch unit can be reduced. Whereas the clutch housing in the dual clutch unit disclosed by EP 1 195 537 B1 is led in a radial direction inwards to the clutch main hub, the rotational drive part in this embodiment of the dual clutch unit according to the invention is preferably led in a radial direction outwards to the clutch main hub, in order not to restrict the overall space for the multi-plate clutches and the associated elements, such as the actuating pistons, for example, and to obtain the rotationally driven connection between the clutch input hub or shaft and the clutch main hub over a relatively short distance. In order to enhance the latter advantage still further, it is furthermore especially preferred in this embodiment if the rotational drive part is in rotationally driven connection with the side of the clutch main hub facing radially inwards.

In order to obtain a more secure arrangement of the clutch input hub or shaft relative to the clutch main hub, with which the clutch input hub or shaft is in rotationally driven connection via the rotational drive part, in a further advantageous embodiment of the dual clutch unit according to the invention at least one radial bearing, preferably a rolling bearing, more preferably a ball bearing, is arranged between the clutch input hub or shaft and the bearing tube. In this way not only the clutch main hub but also the clutch input hub or shaft is securely arranged or supported on the bearing tube.

In order to achieve a rotationally driven connection between the clutch input hub or shaft on the one hand and the clutch main hub on the other, which will ensure both a reliable rotational drive and ease of assembly, in a further preferred embodiment of the dual clutch unit according to the invention the rotational drive part comprises an external toothing, which meshes in an internal toothing or a spur gear toothing on the clutch main hub, the external toothing together with the internal toothing or the spur gear toothing, preferably forming a spline system.

In a further preferred embodiment of the dual clutch unit according to the invention the dual clutch unit is arranged in a bell housing, which is closed by a removable housing cover. The bell housing is preferably a transmission bell housing, whilst the removable housing cover is preferably formed by a transmission housing cover for closing the transmission bell housing. As already indicated previously, the bearing tube is preferably arranged on a fixed housing part, the fixed housing part in this embodiment being formed by the housing cover. In this embodiment the housing cover, the bearing tube fixed to the housing cover and the dual clutch unit supported on the bearing tube may form a module, which is introduced in its entirety into the bell housing, in order to make the connection to the transmission input shafts and then to connect or to bolt the housing cover to the bell housing. This greatly simplifies the process of assembly.

Figure 2:
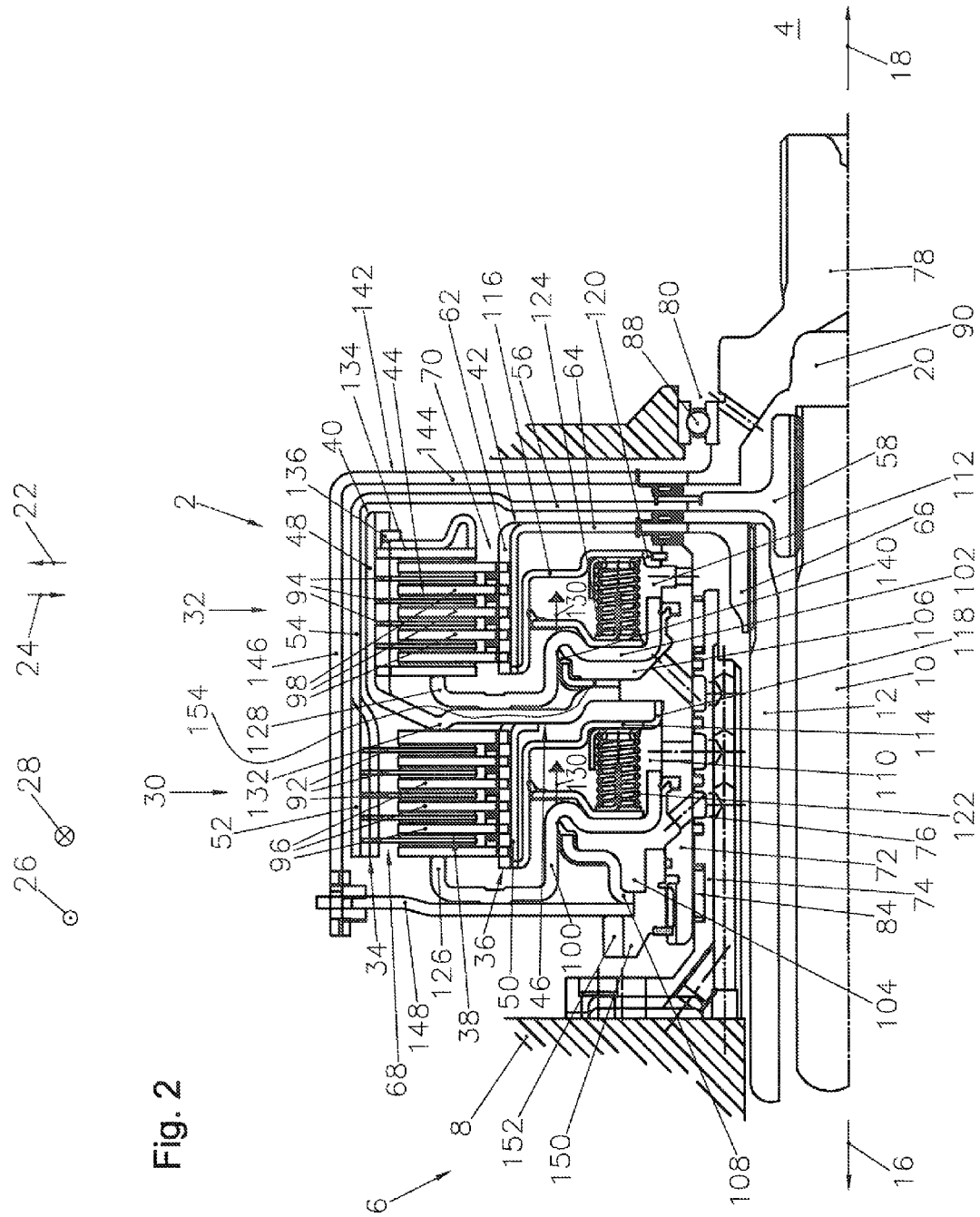

The invention will be explained in more detail below on the basis of exemplary embodiments and with reference to the drawings attached, of which:

FIG. 1 shows a partial side view of a first embodiment of the dual clutch unit according to the invention in a sectional representation and FIG. 2 shows a partial side view of a second embodiment of the dual clutch unit according to the invention in a sectional representation.

FIG. 1 shows a first embodiment of the parallel dual clutch unit 2 inside a drivetrain of a motor vehicle, the dual clutch unit 2 being arranged between a drive unit 4, which is preferably embodied as an internal combustion engine, and a transmission 6. Whilst the drive unit 4 in FIG. 1 is indicated only schematically, a transmission housing 8, a first transmission input shaft 10, a second transmission input shaft 12 and a transmission housing cover 14 of the transmission 6 are shown.

The dual clutch unit 2 is arranged in a transmission bell housing, which is formed by the transmission housing 8 and which is closed by the transmission housing cover 14, the transmission housing cover 14 being removeably fixed to the transmission bell housing of the transmission housing 8. The first transmission input shaft 10 is at least partially formed as a hollow shaft, into which the second transmission input shaft 12 extends in an axial direction 16, 18, so that the second transmission input shaft 12 may also be referred to as inner transmission input shaft 12. The two transmission input shafts 10, 12 are therefore arranged concentrically and radially nested. Besides the opposing axial directions 16, 18 already mentioned, in which the axis of rotation 20 of the dual clutch unit 2 also extends the mutually opposing radial directions 22, 24 and the mutually opposing circumferential directions 26, 28 of the dual clutch unit 2 are also indicated by corresponding arrows in FIG. 1.

The dual clutch unit 2 comprises a first multi-plate clutch 30 and a second multi-plate clutch 32. Whilst the first multi-plate clutch 30 is assigned to the first transmission input shaft 10, for selective transmission of a torque between the drive unit 4 and the first transmission input shaft 10, the second multi-plate clutch 32 is assigned to the second transmission input shaft 12, for selective transmission of a torque between the drive unit 4 and the second transmission input shaft 12. The first multi-plate clutch 30 comprises a first outer plate carrier 34, a first inner plate carrier 36 and a first plate pack 38. The second multi-plate clutch 32 correspondingly comprises a second outer plate carrier 40, a second inner plate carrier 42 and a second plate pack 44.

The second outer plate carrier 40 comprises a radial support portion 46 running substantially in a radial direction 22, 24 and a tubular outer plate bearing portion 48, the outer plate bearing portion 48 being integrally joined to the end of the radial support portion 46, facing outwards in a radial direction 22, and extending from the radial support portion 46 in an axial direction 18. The first inner plate carrier 36 on the other hand comprises a tubular inner plate bearing portion 50 and the radial support portion 46 already previously mentioned, the radial support portion 46 therefore forming a common radial support portion 46 for the radial support both of the first inner plate carrier 36 and of the second outer plate carrier 40. The inner plate bearing portion 50 of the first inner plate carrier 36 extends from the radial support portion 46 in an axial direction 16, so that, in contrast to the outer plate bearing portion 48 of the second outer plate carrier 40, the inner plate bearing portion 50 of the first inner plate carrier 36 extends from the radial support portion 46 in the opposite axial direction. Here the inner plate bearing portion 50 of the first inner plate carrier 36 is not integrally formed with the radial support portion 46, the inner plate bearing portion 50 instead being connected to the radial support portion 46 by positively interlocking, frictional or cohesive material connection, it being preferred if the connection between the inner plate bearing portion 50 and the radial support portion 46 is achieved by positive interlock and/or friction, but not by cohesive material connection. In addition the tubular inner plate bearing portion 50 of the first inner plate carrier 36 has a smaller diameter than the tubular outer plate bearing portion 48 of the second outer plate carrier 40, as can be seen from FIG. 1.

The first inner plate carrier 36 is embodied as input side of the first multi-plate clutch 30, whilst the second outer plate carrier 40 is embodied as input side of the second multi-plate clutch 32. The first outer plate carrier 34 accordingly forms the output side of the first multi-plate clutch 30, whilst the second inner plate carrier 42 forms the output side of the second multi-plate clutch 32, said plate carriers being described in more detail below.

The first outer plate carrier 34 comprises a tubular outer plate bearing portion 52, which extends in an axial direction 16, 18, a tubular bridging portion 54, which extends from the outer plate bearing portion 52 in an axial direction 18 and in so doing bridges the outer plate bearing portion 48 of the second outer plate carrier 40 radially outwards, and a radial support portion 56, which from the bridging portion 54 extends in a radial direction 24 inwards, where via a first clutch output hub 58 it is in rotationally driven engagement with the first transmission input shaft 10. As can further be seen from FIG. 1, the outer plate bearing portion 52 of the first outer plate carrier 34 is offset in a radial direction 24 inwards relative to the tubular bridging portion 54, so that the inside diameter of the outer plate bearing portion 52 is smaller than the inside diameter of the bridging portion 54. Here the outer plate bearing portion 52 is rotationally fixed by a releasable connection to the bridging portion 54. This is preferably achieved in that the outer plate bearing portion 52 is fitted in an axial direction 18 to the bridging portion 54, forming a rotationally fixed connection, the rotationally fixed connection being afforded by a corresponding toothing, for example, whilst a retaining ring 60 axially secures the outer plate bearing portion 52 to the bridging portion 54. The second inner plate carrier 42 likewise comprises a tubular inner plate bearing portion 62, which extends in an axial direction 16, 18, and a radial support portion 64, which adjoins the inner plate bearing portion 62 in an axial direction 18 and which from the inner plate bearing portion 62 extends in a radial direction 24 inwards, to engage in a rotationally driven connection with the second transmission input shaft 12 via a second clutch output hub 66.

The outer plate bearing portion 52 of the first outer plate carrier 34 and the inner plate bearing portion 50 of the first inner plate carrier 36 define a first annular space 68 in a radial direction 22 and 24, inside which the first plate pack 38 is accommodated. The outer plate bearing portion 48 of the second outer plate carrier 40 and the inner plate bearing portion 62 of the second inner plate carrier 42 correspondingly define a second annular space 70 in a radial direction 22 and 24, inside which the second plate pack 44 is arranged, the two annular spaces 68, 70 being separated from one another in an axial direction 16, 18 by the radial support portion 46. Here the outer plate bearing portions 52 and 48 are dimensioned in such a way that the two annular spaces 68 and 70 have the same outside diameter $d_a$. The inner plate bearing portions 50 and 62 are correspondingly dimensioned in such a way that the two annular spaces 68 and 70 have the same inside diameter $d_i$. This serves to ensure that the two plate packs 38, 44 largely overlap one another, when these are viewed in an axial direction 16 or 18. Despite the two annular spaces 68 and 70 having the same outside diameter $d_a$, assembly is relatively simple, especially since the outer plate bearing portion 52 is releasably attached to the bridging portion 54 of the first outer plate carrier 34, as has already been explained previously.

As already mentioned previously, the second outer plate carrier 40 is embodied as input side of the second multi-plate clutch 32, whilst the first inner plate carrier 36 is embodied as input side of the first multi-plate clutch 30, the common radial support portion 46 for this purpose running in a radial direction 24 inwards, where it is rotationally fixed to a tubular clutch main hub 72. Here the clutch main hub 72 is rotatably supported in a radial direction 22, 24 on a fixed bearing tube 74. The bearing tube 74 is arranged on a fixed housing part, which in the embodiment shown is formed by the transmission housing cover 14, already described previously. Here the bearing tube 74 extends in an axial direction 18 into the tubular clutch main hub 72, for rotatable support of the latter, so that the clutch main hub 72 and the bearing tube 74 are arranged radially nested and concentrically. Although this is not shown in FIG. 1, the housing part is embodied in the form of the transmission housing cover 14 and the bearing tube 74, in such a way that the multi-plate clutch 30, 32 can be supplied with hydraulic oil, compensating oil, lubricating oil and/or cooling oil via ducts or lines formed in the transmission housing cover 14 and the bearing tube 74, a rotational bushing 76 furthermore being provided between the fixed bearing tube 74 and the rotatable clutch main hub 72 for this purpose.

In order to be able to transmit the torque of the drive unit 4 to the clutch main hub 72, a clutch input hub or shaft 78 is furthermore provided, which extends in or through the bearing tube 74, to protrude in an axial direction 16 from a opening 80 in the transmission housing cover 14 and to be rotationally fixed either indirectly, for example by way of torsional vibration damper, or directly to the output shaft of the drive unit 4. In the opposite axial direction 18 the clutch input hub or shaft 78 protrudes beyond the bearing tube 74. The clutch main hub 72 also protrudes in an axial direction 18 beyond the bearing tube 74. In order then to establish a rotationally driven connection between the clutch input hub or shaft 78 on the one hand and the clutch main hub 72 on the other, a rotational drive part 82 is provided, which from the clutch input hub or shaft 78 extends in a radial direction 22 outwards and in this way is led to the clutch main hub 72. The rotational drive part 82, which in the embodiment shown is integrally formed with the clutch input hub or shaft 78, but which may equally well be formed separately from the clutch input hub or shaft 78, is in rotationally driven connection with the radially inward facing side 84 of the tubular clutch main hub 72, the rotational drive part 82 for this purpose comprising an external toothing, which meshes in an internal toothing on the tubular clutch main hub 72, in order to form a spline system 86. The spline system 86 allows a simple fitting together of the clutch input hub or shaft 78 and clutch main hub 72 via the rotational drive part 82, affording a rotationally driven connection and therefore an especially easy assembly. Alternatively the internal toothing on the clutch main hub 72 could also be formed by a spur gear toothing on the clutch main hub 72, in which the external toothing on the rotational drive part 82 could likewise mesh.

The clutch input hub or shaft 78 is furthermore rotatably supported in a radial direction 22, 24 by a radial bearing 88, the radial bearing 88 being arranged between the side of the clutch input hub or shaft 78 facing outwards in a radial direction 22 and the side of the bearing tube 74 facing inwards in a radial direction 24. The radial bearing 88 is preferably a rolling bearing, more preferably a ball bearing, as is shown in FIG. 1. A central depression 90, into which the second transmission input shaft 12 can engage in an axial direction 16 together with a portion of the second clutch output hub 66, for support in a radial direction 22, 24 on the clutch input hub or shaft 78 by way of the second clutch output hub 66, is also provided in the end face of the clutch input hub or shaft 78 facing in an axial direction 18. The depression 90 therefore affords an especially compact construction of short overall length in an axial direction 16, 18.

The two plate packs 38, 44 each comprise outer plates 92, 94 and inner plates 96, 98, the outer plates 92, 94 of both plate packs 38, 44 each being embodied as friction lining plates, whilst the inner plates 96, 98 of both plate packs 38, 44 are each embodied as unlined plates. Alternatively, however, the outer plates 92, 94 of both plate packs 38, 44 could also be embodied as unlined plates, whilst the inner plates 96, 98 of both plate packs 38, 44 would then be embodied as friction lining plates. That multi-plate clutch, in which the friction lining plates are arranged on the input side, that is to say in the present example the second multi-plate clutch 32, is therefore optimized in respect of a low drag torque, whilst that multi-plate clutch with the output-side friction lining plates, that is to say in the present example the first multi-plate clutch 30, is optimized in respect of its thermal stability.

The friction lining plates mentioned are preferably friction lining plates having a friction lining one both sides, more preferably friction lining plates which have a paper friction lining. The aforementioned unlined plates are preferably steel plates. In the embodiment shown the outer plates 92 of the first plate pack 38 are of identical construction to the outer plates 94 of the second plate pack 44, so that among other things the outer plates 92 and 94 have the same inside and outside diameter. This applies correspondingly to the inner plates 96 of the first plate pack 38, which are of identical construction to the inner plates 98 of the second plate pack 44, so that among other things the inner plates 96 and 98 have the same inside and outside diameter. In a departure from this, the end plates in each of the axial directions 16 or 18 may be of a different or modified construction.

A hydraulically driven first actuating piston 100 is assigned to the first plate pack 38 of the first multi-plate clutch 30, whilst a hydraulically driven second actuating piston 102 is assigned to the second plate pack 44 of the second multi-plate clutch 32. A first pressure chamber 104, to which hydraulic oil can be admitted, is assigned to the first actuating piston 100, whilst a second pressure chamber 106, to which hydraulic oil can be admitted, is assigned to the second actuating piston 102, the two pressure chambers 104 and 106 in each case being arranged behind the respective actuating piston 100 or 102 in an axial direction 16. Thus the first pressure chamber 104 is defined by the first actuating piston 100, the clutch main hub 72 and a wall portion 108 arranged on the clutch main hub 72. The second pressure chamber 106 on the other hand is defined by the second actuating piston 102, the clutch main hub 72 and the common radial support portion 46, so that here no additional wall portion is required for defining the second pressure chamber 106. In addition, a compensating chamber 110 or 112 situated opposite the pressure chamber 104 or 106 respectively is assigned to each of the two actuating pistons 100 and 102, the first and second compensating chambers 110 and 112 serving for centrifugal oil compensation. In order to form the compensating chambers 110 and 112, a dividing wall 114 or 116, which serves to define the compensating chamber 110 or 112 and a has an overflow opening 118 or 120 for specific adjustment of the centrifugal oil column inside the compensating chamber 110 or 112, is assigned to each of the actuating pistons 100 and 102. Also provided inside the compensating chamber 110 or 112 is at least one spring element 122 or 124, which is supported on the actuating piston 100 or 102 on the one hand and on the dividing wall 114 or 116 on the other, and which therefore serves for returning the actuating piston 100 or 102 in the axial direction 16.

Both actuating pistons 100, 102 further comprise an actuating portion 126 or 128, outwardly situated in a radial direction 22, which is capable of acting upon the plate pack 38 or 44, the actuating portion 126 of the first actuating piston 100 being arranged on the axial side of the first plate pack 38 remote from the radial support portion 46, whilst the actuating portion 128 of the second actuating piston 102 is arranged in an axial direction 16, 18 between the radial support portion 46 and the second plate pack 44. The two multi-plate clutches 30, 32 and the two actuating pistons 100, 102 have the same direction of actuation 130, which in FIG. 1 is indicated by an arrow and in the embodiment shown corresponds to the axial direction 18.

If the first plate pack 38 of the first multi-plate clutch 30 is compressed by the first actuating piston 100 in the direction of actuation 130, the first plate pack 38 is able to rest in an axial direction 18 or in the direction of actuation 130 on the radial support portion 46. In order to afford the most appropriate support possible here on the radial support portion 46, the radial support portion 46 comprises a projection 132, which protrudes in the direction of the first plate pack 38 and on which the first plate pack 38 can be supported in an axial direction 18 or in the direction of actuation 130. The first plate pack 38 is therefore quite specifically not fully supported adjoining the radial support portion 46. Here the projection 132 is embodied as an annular projection 132 or one running all around in a circumferential direction 26, 28, in order to afford the most uniform support possible in an axial direction 18 or in the direction of actuation 130 over the circumferential direction 26, 28. In order to minimize the cost of producing the projection 132 and not to weaken the radial support portion 46 unnecessarily in this area, the projection 132 here is embodied as an outward bulge in the radial support portion 46.

Since the second plate pack 44 in an axial direction 18 or in the direction of actuation 130 cannot be supported directly on the radial support portion 46, an end support plate 134 having a curved cross section, via which the second plate pack 44 in an axial direction 18 or in the direction of actuation 130 can be supported in conjunction with a retaining ring 136 on the outer plate bearing portion 48 of the second outer plate carrier 40, is assigned to the second plate pack 44. Since the second actuating piston 102 is arranged in direct proximity to the radial support portion 46, the radial support portion 46 further comprises a tubular segment 138, which extends in an axial direction 16, 18 and on which the second actuating piston 102 is supported in a radial direction 22, 24 with the interposition of a seal 140, so that the second actuating piston 102 is led in an axial direction 16, 18 sliding on the tubular segment 138 of the radial support portion 46. The tubular segment 138, which is therefore integrally formed with the radial support portion 46, dispenses with the need for a further, separate support wall, which would have to be fixed to the radial support portion 46 or the clutch main hub 72. The construction of the dual clutch unit 2 is therefore simplified significantly.

Although not represented in more detail in FIG. 1, the second transmission input shaft 12, which is embodied as an inner transmission input shaft, is thus assigned to the gear wheel of the first gear of the transmission 6, a synchromesh device being assigned to the first gear wheel. The fact that in the dual clutch unit 2 the output side of the second multi-plate clutch 32, which is assigned to the second transmission input shaft 12, is formed by the second inner plate carrier 42, means that relatively low mass moments of inertia act on the second transmission input shaft 12, so that the synchromesh device, not represented further, for the first gear wheel of the transmission 6 can be of particularly simple or light-gauge design.

In addition, an actuating piston bridging the two plate packs 38 and 44 radially outside, which would have to be elaborately centered and balanced and increases the weight of the dual clutch unit 2 unnecessarily, is dispensed with.

FIG. 2 shows a second embodiment of the dual clutch unit 2 according to the invention inside a drivetrain, the second embodiment substantially corresponding to the first embodiment according to FIG. 1, so that it is proposed to examine only the difference below, the same reference numerals being used for the same or similar parts and the preceding description otherwise applying analogously. As can be seen from FIG. 2, the main components of the dual clutch unit 2 according to FIG. 1 are arranged laterally inverted in an axial direction 16, 18 in the embodiment according to FIG. 2, so that in FIG. 2 the arrows for the axial directions 16 and 18 are reversed compared to FIG. 1, which is also intended to serve for a better understanding of the preceding description as it applies to the second embodiment according to FIG. 2.

A first difference of the second embodiment according to FIG. 2 compared to the first embodiment according to FIG. 1 is that the bearing tube 74 is not arranged on or fixedly attached to the transmission housing cover 14, but is instead arranged on or fixedly attached to the transmission housing 8 situated opposite in an axial direction 16. Only the first and second transmission input shafts 10, 12 therefore extend in an axial direction 16, 18 through the bearing tube 74, whilst the clutch input hub or shaft 78 extending through the opening 80 in the transmission housing cover 14 no longer extends into the bearing tube 74. It is also to be noted that in the second embodiment according FIG. 2 the first transmission input shaft 10 is formed by an inner transmission input shaft, which extends in an axial direction 16, 18 through the second transmission input shaft 12 embodied as a hollow shaft. Since the bearing tube 74 is arranged on the transmission housing 8, or more precisely on the transmission bell housing of the transmission housing 8, the hydraulic, cooling, lubricating and compensating oil is now delivered by way of ducts and lines in the transmission housing 8 and the bearing tube 74, the rotational bushing 76 also in this case being provided between the bearing tube 74 and the clutch main hub 72. The clutch input hub or shaft 78 is also no longer supported by way of a radial bearing on the bearing tube 74, the radial bearing 88 previously described instead now being arranged between the outside of the clutch input hub or shaft 78 and the edge of the opening 80 in the transmission housing cover 14, so that the clutch input hub or shaft 78 is now rotatably supported in a radial direction 22, 24 on the transmission housing cover 14.

As can further be seen from FIG. 2, the outer plate bearing portion 52 is integrally formed with the bridging portion 54 of the first outer plate carrier 34. This may mean, however, that the outside diameters of the annular spaces 68, 70 have to be of different sizes, in order to allow assembly at all. This may furthermore mean that the outer plates 92 of the first plate pack 38 cannot be of identical construction to the outer plates 94 of the second plate pack 44, as can be seen from FIG. 2. For this reason it is preferred also in the embodiment according to FIG. 2, to opt for the two-part construction comprising an outer plate bearing portion 52 and a bridging portion 54, as has already been described with reference to FIG. 1, particularly in order to allow the same outside diameters of the two annular spaces 68, 70 for a simpler assembly.

In contrast to the embodiment according to FIG. 1, the torque is not introduced into the clutch main hub 72 via a rotational drive part 82, which extends outwards from the clutch input hub or shaft 78 in a radial direction 24 outwards to the clutch main hub 72, but instead via an additional clutch housing 142. Both the first multi-plate clutch 30 and the second multi-plate clutch 32 are arranged inside the clutch housing 142. The clutch housing 142 therefore comprises a first radial portion 144, which is rotationally fixed to the clutch input hub or shaft 78 and which extends from the clutch input hub or shaft 78 in a radial direction 22 outwards. Outwardly adjoining the first radial portion 144 in a radial direction 22 is a tubular axial portion 146 of the clutch housing 142. Here the first radial portion 144 and the axial portion 146 are integrally formed. Adjoining the axial portion 146 in an axial direction 16 is a second radial portion 148, which extends in a radial direction 24 inwards to the clutch main hub 72, where it is in rotationally driven connection with the clutch main hub 72 by way of a hub 150. Also provided on the hub 150 is an external toothing 152, which serves for driving another unit, for example an oil pump. The clutch housing 142 or the second radial portion 148 thereof is therefore not led outwards from the clutch input hub or shaft 78 in a radial direction 22, but is instead led in a radial direction 24 inwards to the clutch main hub 72, where it is in rotationally driven connection with the latter.

Although this is not shown in FIG. 2, it is nevertheless preferred also in the second embodiment if the radial support portion 46 comprises the segment 138, previously described with reference to FIG. 1, so as to be able to support the actuating piston 102 sliding on said segment and preferably also forming a seal with the latter. This would also allow the additional wall 154, which is shown in FIG. 2, to be dispensed with.

LIST OF REFERENCE NUMERALS 2 parallel dual clutch unit
4 drive unit
6 transmission
8 transmission housing
10 first transmission input shaft
12 second transmission input shaft
14 transmission housing cover
16 axial direction
18 axial direction
20 axis of rotation
22 radial direction
24 radial direction
26 circumferential direction
28 circumferential direction
30 first multi-plate clutch
32 second multi-plate clutch
34 first outer plate carrier
36 first inner plate carrier
38 first plate pack
40 second outer plate carrier
42 second inner plate carrier
44 second plate pack
46 radial support portion
48 outer plate bearing portion
50 inner plate bearing portion
52 outer plate bearing portion
54 bridging portion
56 radial support portion
58 first clutch output hub
60 retaining ring
62 inner plate bearing portion
64 radial support portion
66 second clutch output hub
68 first annular space
70 second annular space
72 clutch main hub
74 bearing tube
76 rotational bushing
78 clutch input hub or shaft
80 opening
82 rotational drive part
84 side facing radially inwards
86 spline system
88 radial bearing
90 depression
92 outer plates
94 outer plates
96 inner plates
98 inner plates
100 actuating piston
102 actuating piston
104 first pressure chamber
106 second pressure chamber
108 wall portion
110 first compensating chamber
112 second compensating chamber
114 first dividing wall
116 second dividing wall
118 first overflow opening
120 second overflow opening
122 spring element
124 spring, element
126 actuating portion
128 actuating portion
130 direction of actuation
132 projection
134 support plate
136 retaining ring
138 segment
140 seal
142 clutch housing
144 first radial portion
146 axial portion
148 second radial portion
150 hub
152 external toothing
154 additional wall
$d_a$ outside diameter
$d_i$ inside diameter

The invention claimed is:

1. A parallel, dual clutch unit (2) for arrangement in a drivetrain of a motor vehicle between a drive unit (4) and a transmission (6), which comprises a first multi-plate clutch (30) assigned to a first transmission input shaft (10) and having a first plate pack (38), a first inner plate carrier (36) and a first outer plate carrier (34) for selective torque transmission between the drive unit (4) and the first transmission input shaft (10), and a second multi-plate clutch (32) assigned to a second transmission input shaft (12) and having a second plate pack (44), a second inner plate carrier (42) and a second outer plate carrier (40) for selective torque transmission between the drive unit (4) and the second transmission input shaft (12), the first inner plate carrier (36) being embodied as input side and the first outer plate carrier (34) as output side of the first multi-plate clutch (30), wherein the second inner plate carrier (42) is embodied as output side and the second outer plate carrier (40) as input side of the second multi-plate clutch (32), wherein the first inner plate carrier (36) and the second outer plate carrier (40) comprise a common radial support portion (46) for radially supporting these, the first inner plate carrier (36) comprising a first tubular inner plate bearing portion (50), which extends from the radial support portion (46) in an axial direction (16), and the second outer plate carrier (40) comprising a first tubular outer plate bearing portion (48), which extends from the radial support portion (46) in the opposite axial direction (18), the diameter of the first tubular outer plate bearing portion (48) being designed larger than the diameter of the first tubular inner plate bearing portion (50) or the first tubular outer plate bearing portion (48) being integrally formed with the radial support portion (46) and the first tubular inner plate bearing portion (50) being connected by a positively interlocking, frictional or cohesive material connection to the radial support portion (46), wherein the first outer plate carrier (34) comprises a second tubular outer plate bearing portion (52), which together with the first tubular inner plate bearing portion (50) of the first inner plate carrier (36) defines a first annular space (68) to accommodate the first plate pack (38), whilst the second inner plate carrier (42) comprises a second tubular inner plate bearing portion (62), which together with the first tubular outer plate bearing portion (48) of the second outer plate carrier (40) defines a second annular space (70) to accommodate the second plate pack (44), at least the inside or outside diameter ($d_i$, $d_a$), of the first and second annular spaces (68, 70) being of equal size and the first outer plate carrier (34) comprising the second tubular outer plate bearing portion (52) offset radially inwards in relation to a tubular bridging portion (54), which bridges the first tubular outer plate bearing portion (48) of the second outer plate carrier (40) radially outwards, said second tubular outer plate bearing portion (52) of the first outer plate carrier (34) being rotationally fixed by a releasable connection to the bridging portion (54), these being fitted together in an axial direction (16, 18).

2. The dual clutch unit (1) as claimed in claim 1 wherein the radial support portion (46) is rotationally fixed to a tubular clutch main hub (72), which is rotatably supported on a fixed bearing tube (74), which extends into the clutch main hub (72) and through which a clutch input hub or shaft (78) or the first and second transmission input shaft (10, 12) extend.

3. The dual clutch unit (2) as claimed in claim 2, wherein the bearing tube (74) is arranged on a fixed housing part (14, 8), the multi-plate clutches (30, 32) being supplied with oil via the housing part (14, 8) and the bearing tube (74), by means of a rotational bushing (76) between the bearing tube (74) and the clutch main hub (72).

4. The dual clutch unit (2) as claimed in claim 1, wherein the first and second multi-plate clutch (30, 32) have the same direction of actuation (130), a hydraulically driven first actuating piston (100) being provided for the first multi-plate clutch (30) and a hydraulically driven second actuating piston (102) for the second multi-plate clutch (32), the radial support portion (46) comprising a tubular segment (138), on which one of the actuating pistons (100, 102), is supported in a radial direction (22, 24).

5. The dual clutch unit (2) as claimed in claim 1, further comprising the outer plates (92, 94) of the two plate packs (38, 44) are embodied as one of friction lining plates, friction lining plates having a friction lining on both sides, or friction lining plates having a paper friction lining, whilst each of the inner plates (96, 98) of the two plate packs (38, 44) are embodied as one of unlined plates, or steel plates.

6. The dual clutch unit (2) as claimed in claim 5, wherein the outer plates (92, 94) of the two plate packs (38, 44) have the same inside and outside diameter, are of identical construction, or the inner plates (96, 98) of the two plate packs (38, 44) have the same inside and outside diameter and have identical construction.

7. The dual clutch unit (2) as claimed in claim 1, wherein the second transmission input shaft (12) is assigned to the first gear of the transmission (6), the second transmission input shaft (12) being embodied as an inner transmission input shaft (12), which extends into the first transmission input shaft (10) embodied as a hollow shaft, and a synchromesh device is assigned to the first gear wheel.

8. A parallel, dual clutch unit (2) for arrangement in a drivetrain of a motor vehicle between a drive unit (4) and a transmission (6), which comprises a first multi-plate clutch (30) assigned to a first transmission input shaft (10) and having a first plate pack (38), a first inner plate carrier (36) and a first outer plate carrier (34) for selective torque transmission between the drive unit (4) and the first transmission input shaft (10), and a second multi-plate clutch (32) assigned to a second transmission input shaft (12) and having a second plate pack (44), a second inner plate carrier (42) and a second outer plate carrier (40) for selective torque transmission between the drive unit (4) and the second transmission input shaft (12), the first inner plate carrier (36) being embodied as input side and the first outer plate carrier (34) as output side of the first multi-plate clutch (30), wherein the second inner plate carrier (42) is embodied as output side and the second outer plate carrier (40) as input side of the second multi-plate clutch (32), wherein the first inner plate carrier (36) and the second outer plate carrier (40) comprise a common radial support portion (46) for radially supporting these, the first inner plate carrier (36) comprising a tubular inner plate bearing portion (50), which extends from the radial support portion (46) in an axial direction (16), and the second outer plate carrier (40) comprising a tubular outer plate bearing portion (48), which extends from the radial support portion (46) in the opposite axial direction (18), the diameter of the outer plate bearing portion (48) being designed larger than the diameter of the inner plate bearing portion (50) or the outer plate bearing portion (48) being integrally formed with the radial support portion (46) and the inner plate bearing portion (50) being connected by a positively interlocking, frictional or cohesive material connection to the radial support portion (46), wherein one of the plate packs (38, 44), can be supported in an axial direction (18) on the radial support portion (46), the radial support portion (46) comprising a projection (132), which protrudes in the direction of the plate pack (38) and on which the plate pack (38) can be supported in an axial direction (18) and which is of annular design and/or is formed by an outward bulge in the radial support portion (46).

9. A parallel, dual clutch unit (2) for arrangement in a drivetrain of a motor vehicle between a drive unit (4) and a transmission (6), which comprises a first multi-plate clutch (30) assigned to a first transmission input shaft (10) and having a first plate pack (38), a first inner plate carrier (36) and a first outer plate carrier (34) for selective torque transmission between the drive unit (4) and the first transmission input shaft (10), and a second multi-plate clutch (32) assigned to a second transmission input shaft (12) and having a second plate pack (44), a second inner plate carrier (42) and a second outer plate carrier (40) for selective torque transmission between the drive unit (4) and the second transmission input shaft (12), the first inner plate carrier (36) being embodied as input side and the first outer plate carrier (34) as output side of the first multi-plate clutch (30), wherein the second inner plate carrier (42) is embodied as output side and the second outer plate carrier (40) as input side of the second multi-plate clutch (32), wherein the first inner plate carrier (36) and the second outer plate carrier (40) comprise a common radial support portion (46) for radially supporting these, the first inner plate carrier (36) comprising a tubular inner plate bearing portion (50), which extends from the radial support portion (46) in an axial direction (16), and the second outer plate carrier (40) comprising a tubular outer plate bearing portion (48), which extends from the radial support portion (46) in the opposite axial direction (18), the diameter of the outer plate bearing portion (48) being designed larger than the diameter of the inner plate bearing portion (50) or the outer plate bearing portion (48) being integrally formed with the radial support portion (46) and the inner plate bearing portion (50) being connected by a positively interlocking, frictional or cohesive material connection to the radial support portion (46), wherein the radial support portion (46) is rotationally fixed to a tubular clutch main hub (72), which is rotatably supported on a fixed bearing tube (74), which extends into the clutch main hub (72) and through which a clutch input hub or shaft (78) or the first and second transmission input shaft (10, 12) extend, further comprising a clutch housing (142), inside which the first and second multi-plate clutches (30, 32) are arranged and which is rotationally fixed to the clutch main hub (72), a clutch input hub or shaft (78) being in rotationally driven connection with the clutch housing (142).

10. A parallel, dual clutch unit (2) for arrangement in a drivetrain of a motor vehicle between a drive unit (4) and a transmission (6), which comprises a first multi-plate clutch (30) assigned to a first transmission input shaft (10) and having a first plate pack (38), a first inner plate carrier (36) and a first outer plate carrier (34) for selective torque transmission between the drive unit (4) and the first transmission input shaft (10), and a second multi-plate clutch (32) assigned to a second transmission input shaft (12) and having a second plate pack (44), a second inner plate carrier (42) and a second outer plate carrier (40) for selective torque transmission between the drive unit (4) and the second transmission input shaft (12), the first inner plate carrier (36) being embodied as input side and the first outer plate carrier (34) as output side of the first multi-plate clutch (30), wherein the second inner plate carrier (42) is embodied as output side and the second outer plate carrier (40) as input side of the second multi-plate clutch (32), wherein the first inner plate carrier (36) and the second outer plate carrier (40) comprise a common radial support portion (46) for radially supporting these, the first inner plate carrier (36) comprising a tubular inner plate bearing portion (50), which extends from the radial support portion (46) in an axial direction (16), and the second outer plate carrier (40) comprising a tubular outer plate bearing portion (48), which extends from the radial support portion (46) in the opposite axial direction (18), the diameter of the outer plate bearing portion (48) being designed larger than the diameter of the inner plate bearing portion (50) or the outer plate bearing portion (48) being integrally formed with the radial support portion (46) and the inner plate bearing portion (50) being connected by a positively interlocking, frictional or cohesive material connection to the radial support portion (46), wherein the radial support portion (46) is rotationally fixed to a tubular clutch main hub (72), which is rotatably supported on a fixed bearing tube (74), which extends into the clutch main hub (72) and through which a clutch input hub or shaft (78) or the first and second transmission input shaft (10, 12) extend, further comprising a clutch input hub or shaft (78), which extends into the clutch main hub (72), also into the bearing tube (74), and is in rotationally driven connection with the clutch main hub (72) via a rotational drive part (82), the rotational drive part (82) being led in a radial direction (22) outwards to the clutch main hub (72) and being in rotationally driven connection with the radially inward facing side (84) of the clutch main hub (72).

11. The dual clutch unit (2) as claimed in claim 10, further comprising at least one of a radial bearing (88), a rolling bearing, or a ball bearing, is arranged between the clutch input hub or shaft (78) and the bearing tube (74).

12. The dual clutch unit (2) as claimed in claim 10 wherein the rotational drive part (82) comprises an external toothing (152), which meshes in an internal toothing or a spur gear toothing on the clutch main hub (72), the external toothing (152) together with the internal toothing or the spur gear toothing forming a spline system (86).

13. A parallel, dual clutch unit (2) for arrangement in a drivetrain of a motor vehicle between a drive unit (4) and a transmission (6), which comprises a first multi-plate clutch (30) assigned to a first transmission input shaft (10) and having a first plate pack (38), a first inner plate carrier (36) and a first outer plate carrier (34) for selective torque transmission between the drive unit (4) and the first transmission input shaft (10), and a second multi-plate clutch (32) assigned to a second transmission input shaft (12) and having a second plate pack (44), a second inner plate carrier (42) and a second outer plate carrier (40) for selective torque transmission between the drive unit (4) and the second transmission input shaft (12), the first inner plate carrier (36) being embodied as input side and the first outer plate carrier (34) as output side of the first multi-plate clutch (30), wherein the second inner plate carrier (42) is embodied as output side and the second outer plate carrier (40) as input side of the second multi-plate clutch (32), wherein the first inner plate carrier (36) and the second outer plate carrier (40) comprise a common radial support portion (46) for radially supporting these, the first inner plate carrier (36) comprising a tubular inner plate bearing portion (50), which extends from the radial support portion (46) in an axial direction (16), and the second outer plate carrier (40) comprising a tubular outer plate bearing portion (48), which extends from the radial support portion (46) in the opposite axial direction (18), the diameter of the outer plate bearing portion (48) being designed larger than the diameter of the inner plate bearing portion (50) or the outer plate bearing portion (48) being integrally formed with the radial support portion (46) and the inner plate bearing portion (50) being connected by a positively interlocking, frictional or cohesive material connection to the radial support portion (46), wherein the radial support portion (46) is rotationally fixed to a tubular clutch main hub (72), which is rotatably supported on a fixed bearing tube (74), which extends into the clutch main hub (72) and through which a clutch input hub or shaft (78) or the first and second transmission input shaft (10, 12) extend, wherein the dual clutch unit (2) is arranged in a transmission bell housing, which is closed by a removable transmission housing cover (14), the bearing tube (74) being arranged on the transmission housing cover.

* * * * *